F. KITLITSCHKO.
VALVE MECHANISM.
APPLICATION FILED OCT. 2, 1912.

1,060,101.

Patented Apr. 29, 1913.

Witnesses:
Fred Palm
F. E. Dennett

Inventor:
Frank Kitlitschko,
By Flanders, Bothun, Fawsett & Bothun
Attorneys.

UNITED STATES PATENT OFFICE.

FRANK KITLITSCHKO, OF JEFFERSON, WISCONSIN, ASSIGNOR TO WAVERLEY MANUFACTURING COMPANY, OF JEFFERSON, WISCONSIN, A CORPORATION OF WISCONSIN

VALVE MECHANISM.

1,060,101.

Specification of Letters Patent. Patented Apr. 29, 1913.

Application filed October 2, 1912. Serial No. 723,479.

*To all whom it may concern:*

Be it known that I, FRANK KITLITSCHKO, a citizen of the United States, residing at Jefferson, in the county of Jefferson and State of Wisconsin, have invented certain new and useful Improvements in Valve Mechanism, of which the following is a specification, reference being had to the accompanying drawing, forming a part thereof.

This invention relates to internal combustion engines and the objects of the invention are to provide constructions in overhead-valve engines to prevent a valve or the valves dropping into the cylinder so as to be caught between the piston and cylinder head if the valve, or its stem, should break or its supporting mechanism should become disarranged from any cause so that the valve could drop out of place. By the expression "overhead-valve engines" is meant that class of engines which have a valve, or valves, arranged and located above the cylinder in an upright position or in a position which is so nearly upright that if the valve stem, for example, breaks the valve would fall by gravity. It quite frequently happens that the exhaust valve stem becomes weakened by the corrosive and burning action of the hot gases of combustion so that it breaks and the valve, being unsupported, falls by gravity into the cylinder above the piston and on the next upward stroke of the piston is caught between the piston and cylinder head and results in damage to the engine. This invention provides constructions whereby such accidents and damage are obviated.

Figure 1:
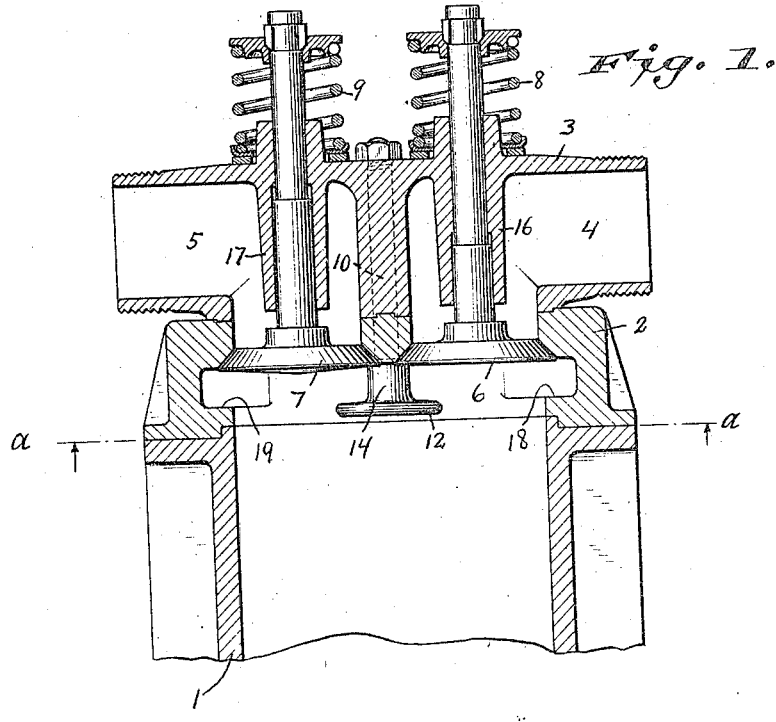
Figure 2:
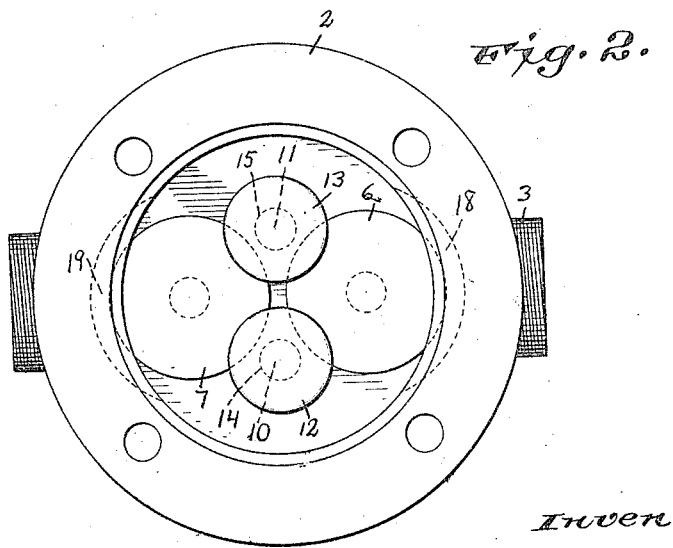

Referring to the drawings which accompany this specification and form a part thereof, on which drawings the same reference characters are employed to designate the same elements wherever they may appear in the several views, and which drawings illustrate embodiments of this invention, Figure 1 is a vertical section through the cylinder head and manifold and part of the cylinder of an overhead-valve internal combustion engine; and Fig. 2 is a bottom plan view of the cylinder head taken on the line *a—a*, Fig. 1, looking in the direction indicated by the arrows.

Referring specifically to the drawings, the reference numeral 1 designates the cylinder, 2 the cylinder head, 3 the manifold provided with admission passage 4 and with exhaust passage 5, 6 the inlet valve, 7 the exhaust valve, and 8 and 9 the springs which tend to hold the valves seated upwardly against their respective seats. The manifold 3 is securely bolted to the cylinder head 2 by the two bolts 10 and 11 which are provided with enlarged flanges or buttons 12 and 13 on their respective heads 14 and 15. Preferably the bolts with their heads and the flanges or buttons are made integral and the flanges are circular, as shown, so that in assembling the manifold with the cylinder head care does not have to be exercised to see that the bolts are turned to any specific position. The flanges or buttons 12 and 13, when the bolts are in position, extend both under the inlet valve 6 and the exhaust valve 7, as clearly shown by the drawings, and are a sufficient distance below the said valves so that they permit the full opening of the valves without, however, being so low as to be in the way of the piston. It will be readily seen that if either valve were to fall for any reason it would be caught and held by the flanges or buttons 12 and 13. The support afforded by the flanges or buttons 12 and 13 would be all that would be necessary under such a condition provided sufficient of the valve stem were retained in a guide 16 or 17 to keep the valve from tipping. A break may occur, and is most likely to occur so near the valve disk that the broken end of the stem would no longer be within the guide when the valve had fallen so that the valve would be free to tip and fall off from the flanges or buttons 12 and 13. To prevent such an occurrence the cylinder head is undercut to form ledges 18 and 19 and the valves are so placed that they are above said ledges, as clearly shown by the drawings, and said ledges are on a level with the upper surfaces of the flanges or buttons 12 and 13. The heads 14 and 15 of the bolts 10 and 11 are near enough to the valves so that they cannot move sidewise (if broken and lying on flanges 12 and 13 and ledges 18 and 19) sufficiently to clear ledges 18 and 19.

The construction illustrated and described forms in effect a cage construction to catch and hold the valves if they should break and drop, without the necessity of increasing the number of separate mechanical elements involved in the construction.

What I claim is:

1. The combination with an upright cylinder and cylinder head on top thereof, the cylinder head being undercut to form a ledge, of an upright valve above said ledge and means adapted to keep said valve upon said ledge and to partly support said valve if it should drop.

2. The combination with an upright cylinder and cylinder head on top thereof of a manifold on top of the cylinder head, upright valves adapted to open downwardly, the cylinder head being undercut to form ledges below the valves, and bolts to secure the manifold to the cylinder head, said bolts being provided with flanges lying below said valves.

In witness whereof I hereto affix my signature in presence of two witnesses.

FRANK KITLITSCHKO.

Witnesses:
W. S. HENRY,
IRMAH BUSCH.